US012538063B2

(12) United States Patent
Shih et al.

(10) Patent No.: US 12,538,063 B2
(45) Date of Patent: Jan. 27, 2026

(54) METHOD AND SYSTEM FOR AUTHENTICATION AND COMPENSATION

(71) Applicant: Harman International Industries, Incorporated, Stamford, CT (US)

(72) Inventors: Shao-Fu Shih, Mountain View, CA (US); Jianwen Zheng, Shenzhen (CN); Songcun Chen, Shenzhen (CN)

(73) Assignee: Harman International Industries, Incorporated, Stamford, CT (US)

( * ) Notice: Subject to any disclaimer, the term of this patent is extended or adjusted under 35 U.S.C. 154(b) by 223 days.

(21) Appl. No.: 18/115,875

(22) Filed: Mar. 1, 2023

(65) Prior Publication Data

US 2023/0209240 A1 Jun. 29, 2023

Related U.S. Application Data

(63) Continuation of application No. PCT/CN2020/112776, filed on Sep. 1, 2020.

(51) Int. Cl.
*H04R 29/00* (2006.01)
*H04R 1/10* (2006.01)
*H04R 3/04* (2006.01)

(52) U.S. Cl.
CPC ............. *H04R 1/1041* (2013.01); *H04R 3/04* (2013.01); *H04R 29/004* (2013.01)

(58) Field of Classification Search
None
See application file for complete search history.

(56) References Cited

U.S. PATENT DOCUMENTS

| | | | |
|---|---|---|---|
| 5,729,612 A | 3/1998 | Abel et al. | |
| 2004/0196991 A1 | 10/2004 | Iida et al. | |
| 2008/0262382 A1* | 10/2008 | Akkermans | G06V 40/10 600/559 |
| 2018/0307818 A1* | 10/2018 | Yano | A61B 5/117 |
| 2019/0007725 A1 | 1/2019 | Ferrer | |
| 2019/0012444 A1 | 1/2019 | Lesso et al. | |
| 2019/0130927 A1 | 5/2019 | Gómez-Bolaños et al. | |
| 2021/0067891 A1* | 3/2021 | Anagnos | H04S 7/306 |

FOREIGN PATENT DOCUMENTS

| | | |
|---|---|---|
| CN | 104240695 | 12/2014 |
| CN | 111212349 | 5/2020 |
| WO | 2016069809 | 5/2016 |

(Continued)

OTHER PUBLICATIONS

Prasad, Saurabh R., and Bhalchandra B. Godbole. Optimization of LMS Algorithm for System Identification. 2017. (Year: 2017).*

(Continued)

*Primary Examiner* — James K Mooney
(74) *Attorney, Agent, or Firm* — Burris Law, PLLC

(57) ABSTRACT

A method includes performing an authentication for a user based on a headphone transfer function (HPTF) of the user when the user wears the headphone. The method includes detecting whether a frequency response deviation exists between the HPTF of the user and a tuned HPTF. The method includes dynamically compensating for the HPTF of the user based on the detected frequency response deviation.

20 Claims, 6 Drawing Sheets

(56) References Cited

FOREIGN PATENT DOCUMENTS

| | | |
|---|---|---|
| WO | 2017161383 | 9/2017 |

OTHER PUBLICATIONS

International Search Report issued in corresponding International Application PCT/CN2020/112776, mailed May 31, 2021.

Extended/Supplementary European Search Report issued in corresponding EP Application 20951854.7, issued Apr. 17, 2024, 10 pages.

Hurley et al., Section 7.3.6 Acoustic Ear Recognition, in Handbook of Biometrics, Eds. Jain et al., 2007, 7 pages, Springer Science + Business Media, LLC, 2008.

Clarke, Transparent User Authentication—Biometrics, RFID and Behavioural Profiling, 2011, 8 pages, Springer London, Limited.

Xie, Head-Related Transfer Function and Virtual Auditory Display, Second Edition, 2013, 50 pages, J. Ross Publishing.

Office Action issued in corresponding CN Application 202080103548.2, issued Jul. 22, 2024, and an English Translation, 13 pages.

* cited by examiner

METHOD AND SYSTEM FOR AUTHENTICATION AND COMPENSATION

CROSS-REFERENCE TO RELATED APPLICATIONS

This application is a continuation of International Application No. PCT/CN2020/112776, filed on Sep. 1, 2020. The disclosure of the above application is incorporated herein by reference.

FIELD

The present disclosure relates to a method and system for biometric authentication and dynamic compensation for a headphone based on headphone transfer function (HPTF).

BACKGROUND

The statements in this section merely provide background information related to the present disclosure and may not constitute prior art.

Biometric authentication is used to enable a seamless user experience to edge devices, such as mobile phones and laptops, while providing device security. To enable a better user experience, various techniques are known to reduce the intent to action time. This intent to action time is defined by the moment the user wants the target device to execute an action to the moment the edge device finishes execution. Modern recognition techniques, such as image and speech recognition techniques, reduce the intent to action time. Recent advancements in edge computing combined with cloud services have greatly improved the quality of life.

Facial recognition is based on having a camera mounted on the target device, and facial recognition is achieved by comparing the pre-registered facial features using neural network related techniques. Various techniques are then used to enhance the visual precision, such as infrared-based (IR-based) depth sensor and stereoscopic imaging. These methods are mostly used to prevent ill-intent personnel from breaking the systems by showing the target's photos. However, these systems tend to be more costly in terms of power consumption and sensor costs. In addition, mobile devices may not include image sensors on the front to achieve higher screen to body ratio.

Speech recognition is based on having a microphone to capture acoustic input and then analyze the real-time streaming input to the pre-registered commands for a match. Since the recognition accuracy is coupled with a signal to noise ratio (SNR), commonly known routines such as multi-mic and noise reduction routines are used to increase accuracy. Multi-channel and noise reduction techniques are also costly in terms of power consumption and sensor costs. Also, voice recognition requires users to speak the keywords, which may be inconvenient in public.

Moreover, commonly in many headphones, the HPTF is measured by using ear simulators on dummy heads. The acoustics operator tunes the frequency response of the headphone according to the measured HPTF. However, due to the individual differences, the HPTF measured by the ear simulator may not be satisfactory. When an end user uses the headphone and listens to the music, the audio output may not be the desired sound that the acoustics operator has tuned. Different listeners may hear different sound in one headphone regardless of how the headphone is worn. In addition, even though the headphone may have sufficient bass performance, the listener may hear a lesser degree of bass when the user does not wear the headphone properly due to air leakage between the headphone and the user's ear.

The individual HPTF of the listener involves the different reflections between the inner surface of the headphone and the eardrum from those of the measured HPTF, or just because of some undesired air leakage, which introduces some timbre distortions.

To play back sounds to different listeners through headphones, the HPTF may be calibrated and compensated.

SUMMARY

This section provides a general summary of the disclosure and is not a comprehensive disclosure of its full scope or all of its features.

According to one aspect of the disclosure, a method of authentication and dynamic compensation for a headphone is provided. The method includes performing the authentication for a user based on a headphone transfer function (HPTF) of the user when the user wears the headphone. The method includes detecting whether a frequency response deviation exists between the HPTF of the user and a tuned HPTF. The method includes dynamically compensating for the HPTF of the user based on the detected frequency response deviation. According to another aspect of the present disclosure, a system of authentication and dynamic compensation for a headphone is provided. The system comprises a computer-readable storage medium and a processor coupled to the memory. The processor is configured to perform the authentication for a user based on headphone transfer function (HPTF) of the user when the user wears the headphone. Further, the processor is configured to detect whether a frequency response deviation exists between the HPTF of the user and a tuned HPTF. Furthermore, the processor is configured to dynamically compensate for the user's HPTF based on the detected frequency response deviation According to yet another aspect of the present disclosure, a computer-readable storage medium comprising computer-executable instructions is provided which, when executed by a computer, causes the computer to perform the methods disclosed herein.

In one aspect, performing the authentication further comprises constructing an HPTF model and an authentication decision, measuring the HPTF of the user, and authenticating the user based on the measured HPTF, the constructed HPTF model, and the authentication decision. In one aspect, constructing the HPTF model and the authentication decision further comprises collecting global HPTF from a plurality of additional users, forming a global model with a global distribution based on the collected global HPTF, collecting local HPTF from the user, forming a local model with a local distribution based on the collected local HPTF, and determining run time loss lost coefficients based on a predefined loss lost function. In one aspect, the method includes computing a feature distance based on the global model and the local model, determining the authentication is successful when the feature distance is closer to the local model than the global model, and determining the authentication is unsuccessful when the feature distance is closer to the global model than the local model. In one aspect, the global model and the local model are based on a Gaussian Mixture Model. In one aspect, the method further comprises measuring an anechoic free field transducer to microphone transfer function. In one aspect, detecting the frequency response deviation between the HPTF of the user and the tuned HPTF further comprises generating an estimated HPTF of the user based on a filtered least mean squared routine, obtaining a magnitude response of the estimated HPTF of the user, comparing the magnitude response and a tuned magnitude response, and determining the frequency response deviation in real time based on the comparison.

According to another aspect of the disclosure, a method of authentication and dynamic compensation for a headphone is provided. The method includes measuring a headphone transfer function (HPTF) of a user when the user wears the headphone, constructing an HPTF model and an authentication decision, and authenticating the user based on the measured HPTF, the constructed HPTF model, and the authentication decision. The method includes generating an estimated HPTF of the user based on a filtered least mean squared routine, obtaining a magnitude response of the estimated HPTF of the user, comparing the magnitude response and a tuned magnitude response, detecting a frequency response deviation between the HPTF of the user and a tuned HPTF, and dynamically compensating for the HPTF of the user based on the detected frequency response deviation.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
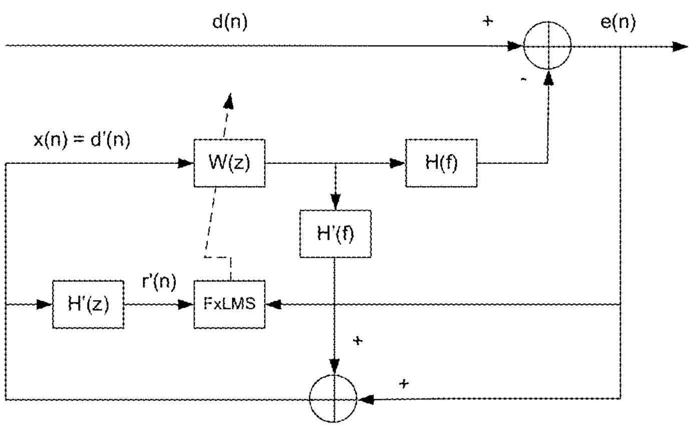
FIG. 1 illustrates a system configuration of a filtered least mean squared (FxLMS) routine according to one or more embodiments of the present disclosure.

To facilitate understanding, identical reference numerals have been used, where possible, to designate identical elements that are common to the figures. It is contemplated that elements disclosed in one embodiment may be utilized in other embodiments without specific recitation. The drawings referred to here should not be understood as being drawn to scale unless specifically noted. Also, the drawings are often simplified, and details or components may be omitted for clarity of presentation and explanation. The drawings and discussion serve to explain principles discussed below, where like designations denote like elements.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Examples will be provided below for illustration. The descriptions of the various examples will be presented for purposes of illustration, but are not intended to be exhaustive or limited to the embodiments disclosed. Many modifications and variations will be apparent to those of ordinary skill in the art without departing from the scope and spirit of the described embodiments.

The headphone transfer function (HPTF) is defined as the acoustic transfer function from the speaker of a headphone to the sound pressure at the eardrum. In general, the individual HPTF varies with different headphones or listeners, since each headphone has its own designed feature, and each listener has unique characteristics of the ear. Accordingly, this disclosure will provide embodiments for applications based on HPTF. For example, in a headphone product, the method and the system discussed herein may be applied to a biometric authentication. After the biometric authentication, the disclosure will provide a method and system for detection and calibration of frequency response deviation to obtain a desired sound performance for individual users during use of the headphone product.

Active Noise Cancelling (ANC) headphones are based on monitoring the surrounding noise. Namely, it captures the environmental sound using both internal and external microphones. Then, by keeping the magnitude and inverting the phase of the surrounding noise with calibrated playback system, high precision anti-noise with closely coupled feedback loops can be reproduced.

HPTF is relevant to at least two parts, e.g., the free field measurement and the impulse response between the pinna plus ear canal and the internal microphone. Since the free field measurement can be measured in a controlled environment, and the manufacture tolerance can be calibrated in production line, the remaining variable is the microphone to pinna plus ear canal response, which is referred to hereinafter as Ear Reference Point (ERP) to Ear Entrance Point (EEP). This ERP to EEP transfer function ($H_{ear}$) is different from person to person between pinna plus ear canal.

FIG. 1 illustrates a schematic diagram for a system configuration of the FxLMS in accordance with one or more embodiments of the present disclosure. $H_{ear}$ can be dynamically computed with a system identification algorithm, such as FxLMS and as shown below in relation (1).

$$w(n+1)=w(n)-\mu e(n)r'(n) \quad (1)$$

In relation (1), $\mu$ is the adaptation step-size, w(n) is the weight vector at time n, $e(n)=d(n)+w^T(n)r(n)$. e(n) is the residual noise measured by the error microphone, d(n) is the noise to be canceled, and r(n) and r'(n) are obtained from the convolutions $r(n)=h(n)*x(n)$ and $r'(n)=h'(n)*x(n)$, respectively. x(n) is the synthesized reference signal, and h(n) and h'(n) are the impulse responses H(f) and H'(f) respectively. H(f) is the transfer function of the secondary path, and H'(f) is the estimate of H(f), which is also regarded as HPTF. The system configuration of FxLMS are illustrated as FIG. 1.

Figure 2:
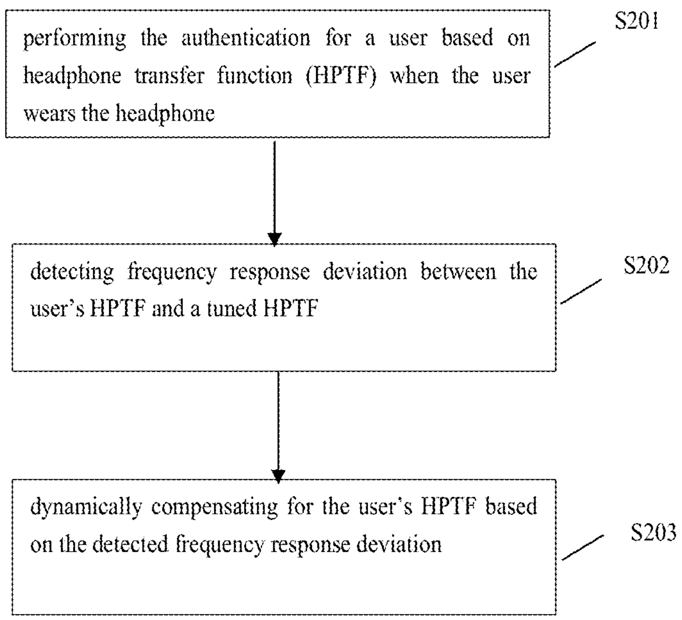
FIG. 2 illustrates a flowchart of a method of authentication and dynamic compensation for a headphone according to one or more embodiments of the present disclosure.

FIG. 2 illustrates a flowchart of the method of authentication and dynamic compensation for a headphone according to one or more embodiments of the present disclosure. As shown in FIG. 2, at S201, the authentication for a user is performed based on a headphone transfer function (HPTF) when the user wears the headphone. The authentication result may be used to determine whether the user can continuously use the headphone. Then, to obtain desired sound performance of the headphone, adaptive and effective calibration and compensation may be performed in real time. For example, at S202, the frequency response deviation between the user's HPTF and a tuned HPTF is detected. Then, at S203, dynamically compensating for the user's HPTF is performed based on the detected frequency response deviation. The detailed implementations of the method shown in FIG. 2 will be illustrated below.

HPTF Authentication

As for the application of authentication, the HPTF difference problem can be transformed into an identification problem, which could be solved with statistically modelling, such as Bayes approach and neural networks.

To distinguish between a generic HPTF to the target user, statistical models will be used. In this embodiment, a Gaussian Mixture Model (GMM) is constructed based on the impulse response measured. To construct the GMM reference, the free field response in the anechoic chamber is first measured as $H_{free\text{-}field}$(f). For each data point i∈P persons, which is measured M times (total size of P*M) used for training, the transducer to microphone transfer function is captured and is depicted as $H_{HPTF}$(f) (i omitted). Then $H_{ear}$(f) is obtained based on relation (2) shown below.

$$H_{ear}(f)=H_{HPTF}(f)/H_{free\text{-}field}(f) \tag{2}$$

To increase the accuracy, the data may be pre-processed into magnitude data and relative phase data, as shown below in relations (3)-(4).

$$|H_{ear}(f)|=\sqrt{\mathrm{Re}(H_{ear}(f))^2+\mathrm{Im}(H_{ear}(f))^2} \tag{3}$$

$$\angle H_{ear}(f)=\tan^{-1}[\mathrm{Im}(H_{ear}(f))/\mathrm{Re}(H_{ear}(f))] \tag{4}$$

Then, each data point (i) can be treated as a vector of [magnitude, phase]×[left, right] per sample data and measured M times on each test subject's head for different fittings. The global model then is trained following the GMM model construction procedure accordingly to obtain X~$N_{global}$(μ, σ).

HPTF Model Construction and Authentication Decision

Figure 3:
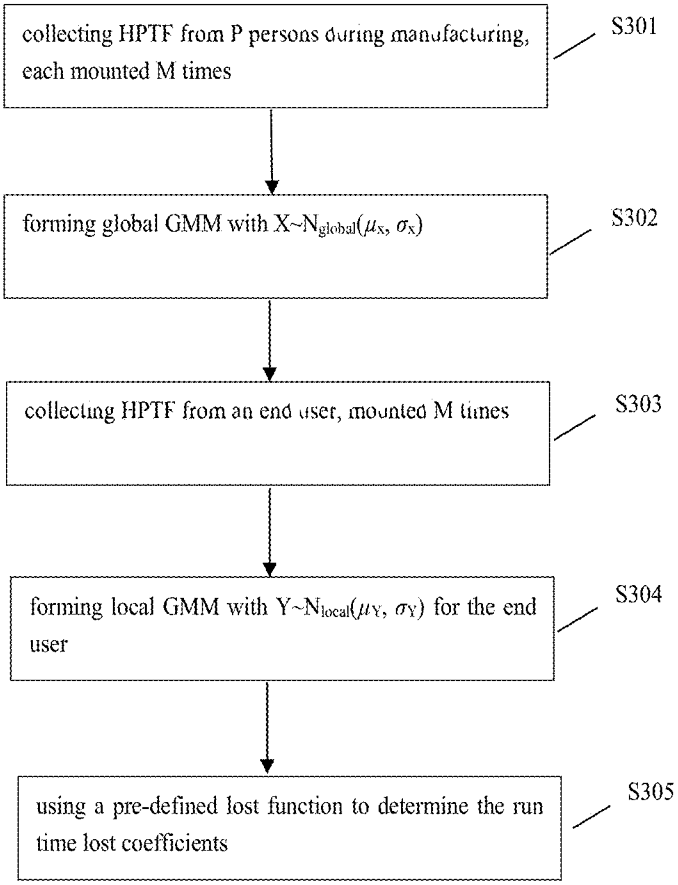
FIG. 3 illustrates a flowchart of a method for constructing an HPTF model and authentication decision according to one or more embodiments of the present disclosure.

FIG. 3 illustrates a method flowchart for constructing HPTF model and authentication decision according to one or more embodiments of the present disclosure.

For example, anechoic free field transducer to microphone transfer function may be measured, i.e., $H_{free\text{-}field}$(f) is obtained. Referring to FIG. 3, at S301, the HPTF from P persons during manufacturing may be collected, each mounted M times. At S302, based on the collected HPTF, a global GMM with X~$N_{global}$($\mu_x$, $\sigma_x$) is formed. Then, at S303, HPTF from an end user may be collected, and mounted M times. Based on the collected HPTF from the end user, at S304, local GMM with Y~$N_{local}$($\mu_Y$, $\sigma_Y$) is formed. At S305, by using a pre-defined loss function, such as minimum mean square error (MMSE), the run time loss lost coefficients are determined.

To register a new target, by using FxLMS combined with the stored $H_{free\text{-}field}$(f), $H_{target}$(f)=$H_{HPTF}$(f)/$H_{free\text{-}field}$(f) can be extracted, and this process for the target user will be repeated M times to create local model as Y~$N_{local}$(μ, σ) by predefined feature distance D, which in this case, could be simplified as the distribution Minimum Mean Square Error (MMSE), as shown below in relation (5).

$$D(X,Y,\sigma)=M\ln\left(\frac{1}{\sqrt{2\pi\sigma}}\right)\frac{-1}{2\sigma}\sum_{i=1}^{M}(Y_i-\beta_0-\beta_1X_{1i}-\ldots-\beta_PX_{Pi})^2 \tag{5}$$

In relation (5), $\beta_0$ . . . $\beta_P$ are parameter estimates.

To achieve bio-authentication using the model created above, the distance function is computed as the following: if mean(‖X−Y‖)>(‖Y−$\mu_Y$‖), as the feature distance, is closer to local Y~$N_{local}$($\mu_Y$, $\sigma_Y$) than global X~$N_{global}$($\mu_x$, $\sigma_x$), then it can be determined that the device is authenticated. Otherwise, if the feature distance is closer to global X~$N_{global}$($\mu_x$, $\sigma_x$) than local Y~$N_{local}$($\mu_Y$, $\sigma_Y$), then the authentication returns failure as result.

Runtime HPTF Extraction Model

Figure 4:
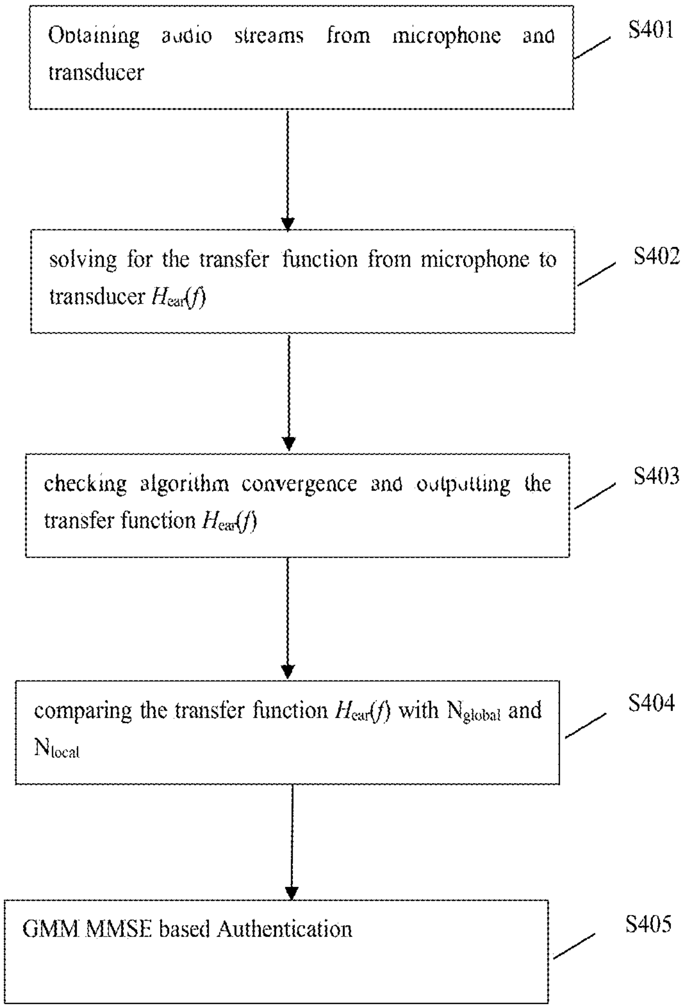
FIG. 4 illustrates a flowchart of a method for real-time authenticating a user based on an HPTF according to one or more embodiments of the present disclosure.

FIG. 4 illustrates a method flowchart for real-time authenticating a user based on the HPTF according to one or more embodiments of the present disclosure. At S401, when the end user uses the headphone, audio streams from the microphone and transducer can be obtained. Optionally, checking for the audio playback and user input may be performed before obtaining audio streams from microphone and transducer. At S402, the transfer function $H_{ear}$(f) between transducer and microphone may be obtained as mention above. Optionally, at S403, the FxLMS algorithm convergence is further checked and the transfer function $H_{ear}$(f) is output if the FxLMS algorithm is convergent. At S404, the transfer function is compared with the global X~$N_{global}$($\mu_x$, $\sigma_x$) and the local Y~$N_{local}$($\mu_Y$, $\sigma_Y$). Then, at S405, GMM MMSE based Authentication may be performed, based on the comparison. For example, if the feature distance is closer to local Y~$N_{local}$($\mu_Y$, $\sigma_Y$) than global X~$N_{global}$($\mu_x$, $\sigma_x$), then the device is authenticated. Otherwise, if the feature distance is closer to global X~$N_{global}$($\mu_x$, $\sigma_x$) than local Y~$N_{local}$($\mu_Y$, $\sigma_Y$), then the authentication process returns failure as result.

Deviation Detection and Frequency Response Calibration

To playback sounds to different listeners through headphones and improve the sound experience of the user, the HPTF may be calibrated and compensated. For example, one method may be used to put a microphone inside the ear canal of the listener and perform a one-time calibration or playing a sweep signal or other measurement signal. It can compensate the HPTF but may maintain a short time after the compensation, since the listener might not wear the headphone at the same position each time, which means the listener has to repeat this calibration every time the user wants to use the headphone. Otherwise, the calibration may be ineffective. An improved adaptive and effective method for compensation in real time is further disclosed herein.

Considering that listeners may wear the headphone with air leakage, and different listeners have different HPTFs among each other and compared to a standard dummy head, a method is proposed herein to compensate the difference between the real HPTF and the well-designed one by the acoustics operator.

Figure 5:
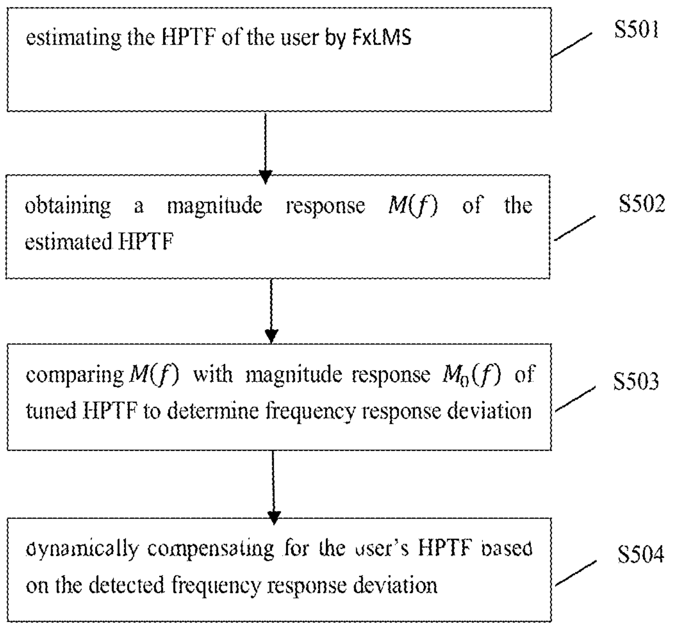
FIG. 5 illustrates a flowchart of a method for dynamic compensation based on an HPTF according to one or more embodiments of the present disclosure.

FIG. 5 illustrates a block diagram of dynamic compensation based on HPTF according to one or more embodiments of the present disclosure. At S501, HPTF H(f) of a listener by FxLMS may be estimated, and at S502, the magnitude response of the estimated HPTF H(f) of a listener by FxLMS is obtained. Also, the magnitude response of the tuned HPTF $H_0(f)$ from an operator may be obtained. The magnitude response of the estimated HPTF H(f) and the tuned HPTF $H_0(f)$ may be provided based on relation (6) shown below.

$$M(f)=|H(f)|, M_0(f)=|H_0(f)| \quad (6)$$

In relation (6), "| |" is the absolute value operator. Then, at S503, M(f) and $M_0(f)$ are compared to determine the frequency response deviation is when the listener wears the headphone, for example, to determine how much the air leakage is in low frequency range.

Then, at S504, the dynamic compensation for the user's HPTF curve is performed based on the detected frequency response deviation. For example, a smooth and limited calibration function F(*) is used to obtain the compensated magnitude $M_c(f)$ of their difference, as shown below in relation (7).

$$M_c(f)=F(M_0(f)-M(f)) \quad (7)$$

Figure 6:
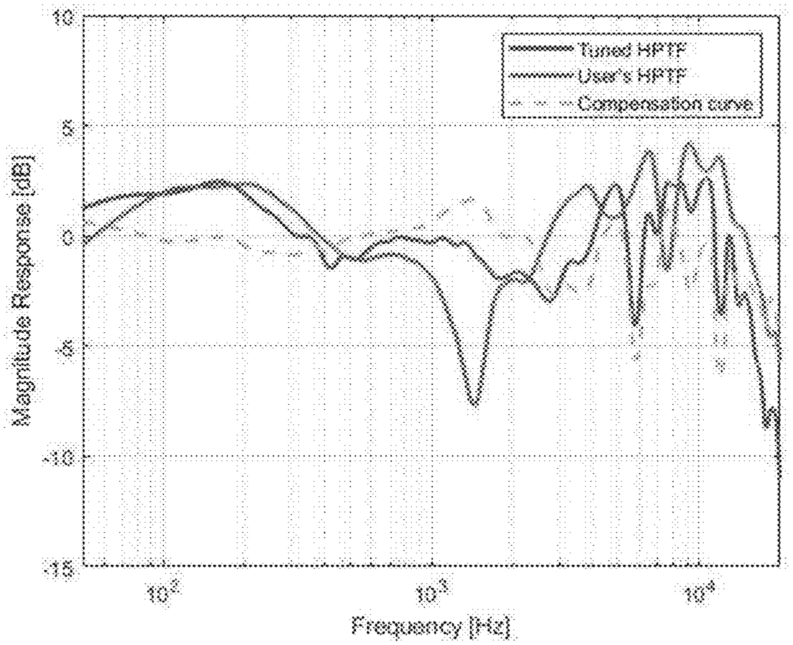
FIG. 6 illustrates an example result of a tuned HPTF curve, a user's HPTF curve, and the corresponding compensation curve according to one or more embodiments of the present disclosure.

In relation (7), F(*) may be a linear or nonlinear function, for example, $$F(x) = \frac{\alpha x}{\sqrt{\beta + x^2}},$$

and α and β are two parameters we can tune depending on the real system. FIG. 6 demonstrates an example of a tuned HPTF curve, a user's HPTF curve, and the corresponding compensation curve.

Figure 7:
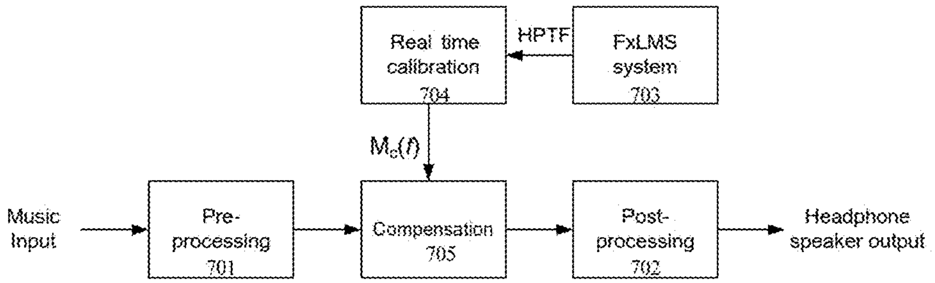
FIG. 7 illustrates a block diagram of a dynamic compensation based on am HPTF according to one or more embodiments of the present disclosure.

FIG. 7 illustrates a block diagram of dynamic compensation based on HPTF according to one or more embodiments of the present disclosure. As shown in FIG. 7, the system for dynamic compensation may include a pre-processing unit 701, a post-processing unit 702, a FxLMS system 703, a real-time calibration unit 704 and a compensation unit 705. For example, when the user wears the headphone to listen to music, the music input may be first pre-processed by the pre-processing unit 701, such as by analog to digital (A/D) conversion, equalization (EQ), Adaptive Limiter, downmix, etc. Then, the pre-processed data is input into the compensation unit 705. By using the FxLMS system 703, the transfer function HPTF of a listener can be estimated as discussed above. In the real-time calibration unit 704, the magnitude response of the HPTF H(f) is compared with the magnitude response of the tuned HPTF $H_0(f)$ from the operator, and then a smooth and limited calibration function may be used to obtain the compensated magnitude $M_c(f)$. Then, the compensated magnitude $M_c(f)$ is output to the compensation unit 705 for performing the dynamic compensation based on the compensated magnitude $M_c(f)$. The post-processing unit 702 may post-process the compensated data, for example by EQ, Adaptive Limiter, etc.

In this disclosure, systems and methods are provided to detect the individual differences between HPTF across different users. The systems and methods demonstrate the leverage the differences for an application, such as biometric authentication and headphone fitness detection based on frequency response deviation. Finally, based on the delta difference between the detected HPTF and the target curve, dynamic compensation for the differences can be performed and consistent listening experiences are provided.

Figure 8:
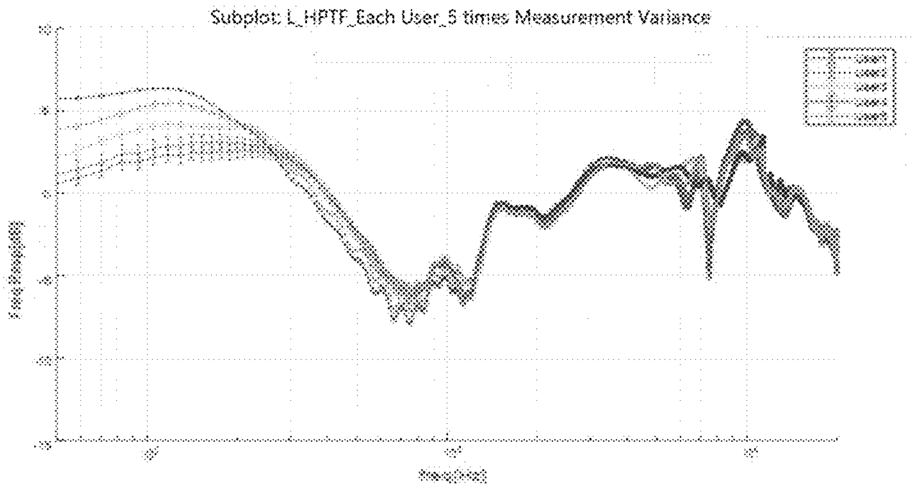
FIG. 8 illustrates experimental results for HPTF curves for left ears of users according to one or more embodiments of the present disclosure.
Figure 9:
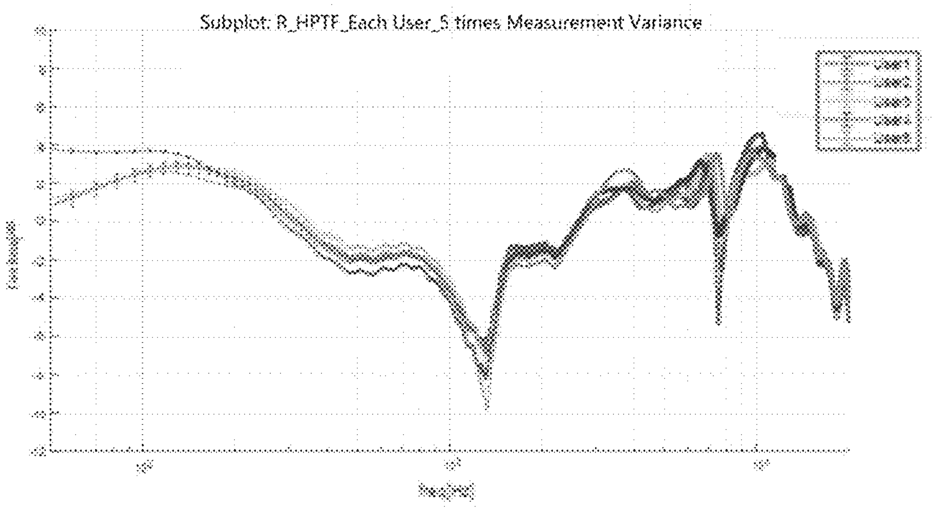
FIG. 9 illustrates experimental results for HPTF curves for right ears of users according to one or more embodiments of the present disclosure.

FIG. 8 and FIG. 9 illustrate experimental results of HPTF curves for left and right ears of users. For example, the experiment is conducted by randomly selecting five users and each user puts the headphone on normally to extract the HPTF accordingly. FIG. 8 and FIG. 9 show the mean and variance of each user stacked on top of each other for left and right ears, respectively. As demonstrated from the results, there are identifiable differences in the distribution between each person and could be depicted as the feature distance as described herein. This feature distance is particularly apparent around 500 Hz to 2 kHz and from 5 kHz to 15 kHz, as those frequencies are associated with the pinna and ear canal differences between the test subjects. FIG. 8 also indicates there is some air leakage in the left channel of the headphone since the frequency responses below 200 Hz of each user vary considerably.

The systems and methods described herein use the run-time computed HPTF model to interact with hearable devices. Such actions may be found in consumer devices, such as unlocking secure devices (e.g., mobile phones) and acoustic personalization (e.g. play/pause, load/store playlist, etc.). The systems and methods may also be applied to e-commerce and software services. For example, authentication protocol for secured payments (e.g., Google® Store) and conference software for identity identification and verification (e.g., WebEx® login ID automated meeting setup). The technique disclosed herein is based on the differences of HPTF between individuals from both the left and right ears and provides an alternative embodiment for both digital authentication and human computer interaction. The systems and methods described herein are applicable to the method of using statistical analysis to determine the hearable acoustic behavior.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module", "unit" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the drawings illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:

measuring a headphone transfer function (HPTF) of a user;

authenticating the user based on an ear reference point (ERP) to ear entrance point (EEP) transfer function and the HPTE, wherein the ERP to EEP transfer function is indicative of an impulse response between a pinna plus ear canal of the user and an internal microphone of a headphone;

detecting a frequency response deviation between the HPTF of the user and a tuned HPTF; and dynamically compensating for the HPTF of the user based on detecting the frequency response deviation.

2. The method according to claim 1, wherein authenticating the user further comprises:

constructing an HPTF model and an authentication decision; and authenticating the user based on the measured HPTF, the constructed HPTF model, and the authentication decision.

3. The method according to claim 2, wherein constructing the HPTF model and the authentication decision further comprises:

collecting a global HPTF from a plurality of additional users;

forming a global model with a global distribution based on the collected global HPTF;

collecting a local HPTF from the user;

forming a local model with a local distribution based on the collected local HPTF; and determining run time loss coefficients based on a predefined loss function.

4. The method according to claim 3, wherein the method further comprises:

computing a feature distance based on the global model and the local model;

determining the authentication is successful when the feature distance is closer to the local model than the global model; and determining the authentication is unsuccessful when the feature distance is closer to the global model than the local model.

5. The method according to claim 3, wherein the global model and the local model are based on a Gaussian Mixture Model.

6. The method according claim 3, wherein the method further comprises measuring an anechoic free field transducer to microphone transfer function, and wherein forming the global model is further based on measuring the anechoic free field transducer to microphone transfer function.

7. The method according to claim 1, wherein detecting the frequency response deviation between the HPTF of the user and the tuned HPTF further comprises:

generating an estimated HPTF of the user based on a filtered least mean squared routine;

obtaining a magnitude response of the estimated HPTF of the user;

comparing the magnitude response and a tuned magnitude response; and determining the frequency response deviation in real time based on a comparison of the magnitude response and the tuned magnitude response.

8. A computer-readable storage medium comprising computer-executable instructions which, when executed by a computer, causes the computer to perform the method according to claim 1.

9. A system comprising:

a computer-readable storage medium; and a processor coupled to the computer-readable storage medium;

wherein the processor is configured to:

measure a headphone transfer function (HPTF) of the user;

authenticate a user based on an ear reference point (ERP) to ear entrance point (EEP) transfer function, wherein the ERP to EEP transfer function is indicative of an impulse response between a pinna plus ear canal of the user and an internal microphone of a headphone;

detect a frequency response deviation between the HPTF of the user and a tuned HPTF; and dynamically compensate for the HPTF of the user based on detecting the frequency response deviation.

10. The system according to claim 9, wherein the processor is further configured to:

construct an HPTF model and an authentication decision; and authenticate the user based on the measured HPTF, the constructed HPTF, and the authentication decision.

11. The system according to claim 10, wherein the processor is further configured to:

collect a global HPTF from a plurality additional users;

form a global model with a global distribution based on the collected HPTF;

collect a local HPTF from the user;

form a local model with a local distribution based on the collected HPTF; and determine run time loss coefficients based on a predefined loss function.

12. The system according to claim 11, wherein the processor is further configured to:

compute a feature distance based on the global model and the local model;

determine the authentication is successful when the feature distance is closer to the local model than the global model; and determine the authentication is unsuccessful when the feature distance is closer to the global model than the local model.

13. The system according to claim 11, wherein the global model and the local model are based on a Gaussian Mixture Model.

14. The system according to claim 11, wherein the processor is further configured to measure an anechoic free field transducer to microphone transfer function, and wherein the processor is further configured to form the global model based on measuring the anechoic free field transducer to microphone transfer function.

15. The system according to claim 9, wherein the processor is further configured to:

generate an estimated HPTF of the user based on a filtered least mean squared routine;

obtain a magnitude response of the estimated HPTF of the user;

compare the magnitude response and a tuned magnitude response; and determine the frequency response deviation in real time based on a comparison of the magnitude response and the tuned magnitude response.

16. A method comprising:

measuring a headphone transfer function (HPTF) of a user when the user wears the headphone;

constructing an HPTF model and an authentication decision;

authenticating the user based on the measured HPTF, the constructed HPTF model, and the authentication decision, wherein authenticating the user is further based on an ear reference point (ERP) to ear entrance point (EEP) transfer function, and further wherein the ERP to EEP transfer function is indicative of an impulse response between a pinna plus ear canal of the user and an internal microphone of a headphone;

generating an estimated HPTF of the user based on a filtered least mean squared routine;

obtaining a magnitude response of the estimated HPTF of the user;

comparing the magnitude response and a tuned magnitude response;

detecting a frequency response deviation between the HPTF of the user and a tuned HPTF; and dynamically compensating for the HPTF of the user based on detecting the frequency response deviation.

17. The method according to claim 16, wherein constructing the HPTF model and the authentication decision further comprises:

collecting a global HPTF from a plurality of additional users;

forming a global model with a global distribution based on the collected global HPTF;

collecting a local HPTF from the user;

forming a local model with a local distribution based on the collected local HPTF; and determining run time loss coefficients based on a predefined loss function.

18. The method according to claim 17, wherein the method further comprises:

computing a feature distance based on the global model and the local model;

determining the authentication is successful when the feature distance is closer to the local model than the global model; and determining the authentication is unsuccessful when the feature distance is closer to the global model than the local model.

19. The method according to claim 17, wherein the global model and the local model are based on a Gaussian Mixture Model.

20. The method according claim 17, wherein the method further comprises measuring an anechoic free field transducer to microphone transfer function, and wherein forming the global model is further based on measuring the anechoic free field transducer to microphone transfer function.

* * * * *